United States Patent

Brusselle

[11] 4,128,915
[45] Dec. 12, 1978

[54] MACHINE FOR THE SHAPING OF MEAT DISHES

[76] Inventor: Victor Brusselle, De Smet deNaeyerlaan 16, 8370 Blankenberge, Belgium

[21] Appl. No.: 749,043

[22] Filed: Dec. 9, 1976

[30] Foreign Application Priority Data

Dec. 23, 1975 [BE] Belgium .................................. 254732
Nov. 9, 1976 [BE] Belgium .................................. 255431

[51] Int. Cl.² ............................................. A22C 7/00
[52] U.S. Cl. ....................................................... 17/32
[58] Field of Search ................. 17/32; 99/450.7, 450.8; 100/218; 101/425

[56] References Cited

U.S. PATENT DOCUMENTS

| | | | |
|---|---|---|---|
| 1,651,040 | 11/1927 | Reilly | 17/32 |
| 1,968,384 | 7/1934 | Gaunt | 17/32 |
| 1,987,030 | 1/1935 | Shelgren | 17/32 |
| 2,027,281 | 1/1936 | Lista | 17/32 |
| 2,150,659 | 3/1939 | Santo | 17/32 |
| 2,185,174 | 1/1940 | Hendler | 17/32 |
| 2,244,540 | 6/1941 | Lenzke | 17/32 |
| 2,475,463 | 7/1949 | Santo | 17/32 |
| 2,763,026 | 9/1956 | Holly | 17/32 |
| 3,293,688 | 12/1966 | Holly | 17/32 |
| 3,461,820 | 8/1969 | Falco | 17/32 |
| 3,588,948 | 6/1971 | Holly | 17/32 |
| 3,654,665 | 4/1972 | Holly | 17/32 |
| 3,806,989 | 4/1974 | Holly | 17/32 |
| 4,058,059 | 11/1977 | Moestue | 17/32 |

Primary Examiner—Russell R. Kinsey
Assistant Examiner—Paul J. Hirsch
Attorney, Agent, or Firm—Bacon & Thomas

[57] ABSTRACT

The invention pertains to a machine for shaping meat dishes, characterized by the fact that it mainly consists of the combination of a mould plate provided therein with the desired mould opening; means which successively place this mould opening under a meat supply and, after filling, remove it from under said meat supply; means which press the meat supply towards aforesaid plate in order to assure the proper filling of aforesaid mould opening, and means which push the shaped dish out of the mould, whereby all these means function automatically and in the correct sequence by the one handed operation of a single control lever.

6 Claims, 17 Drawing Figures

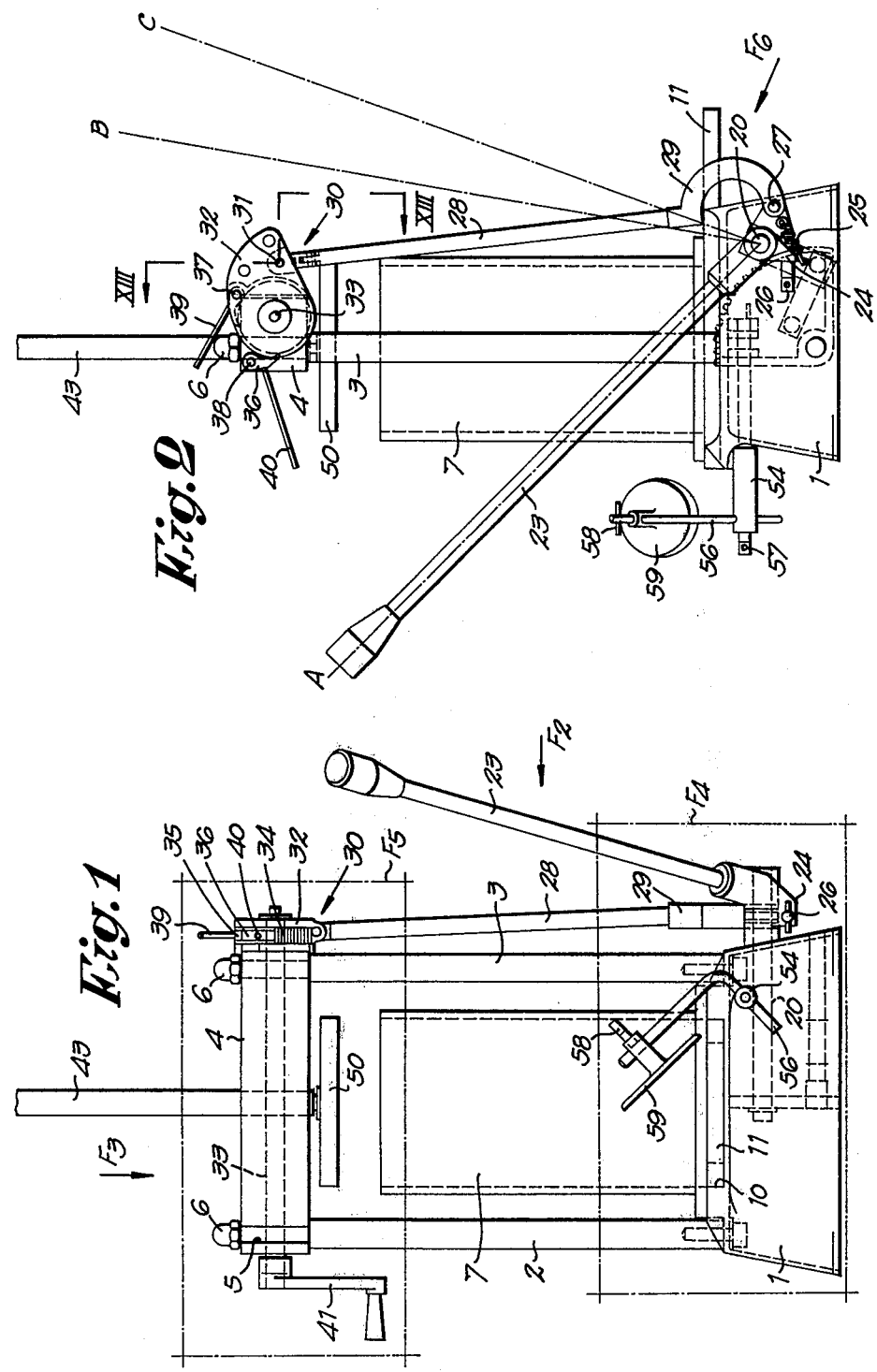

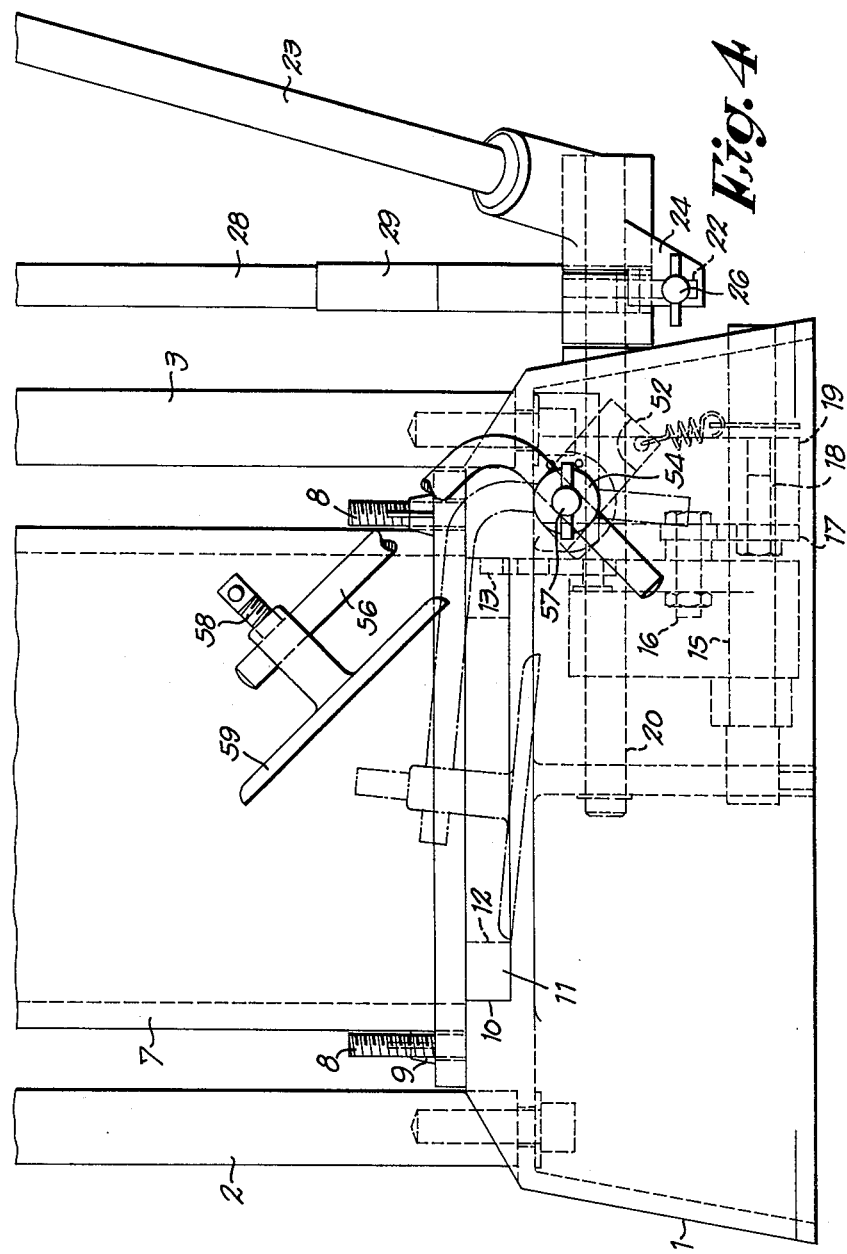

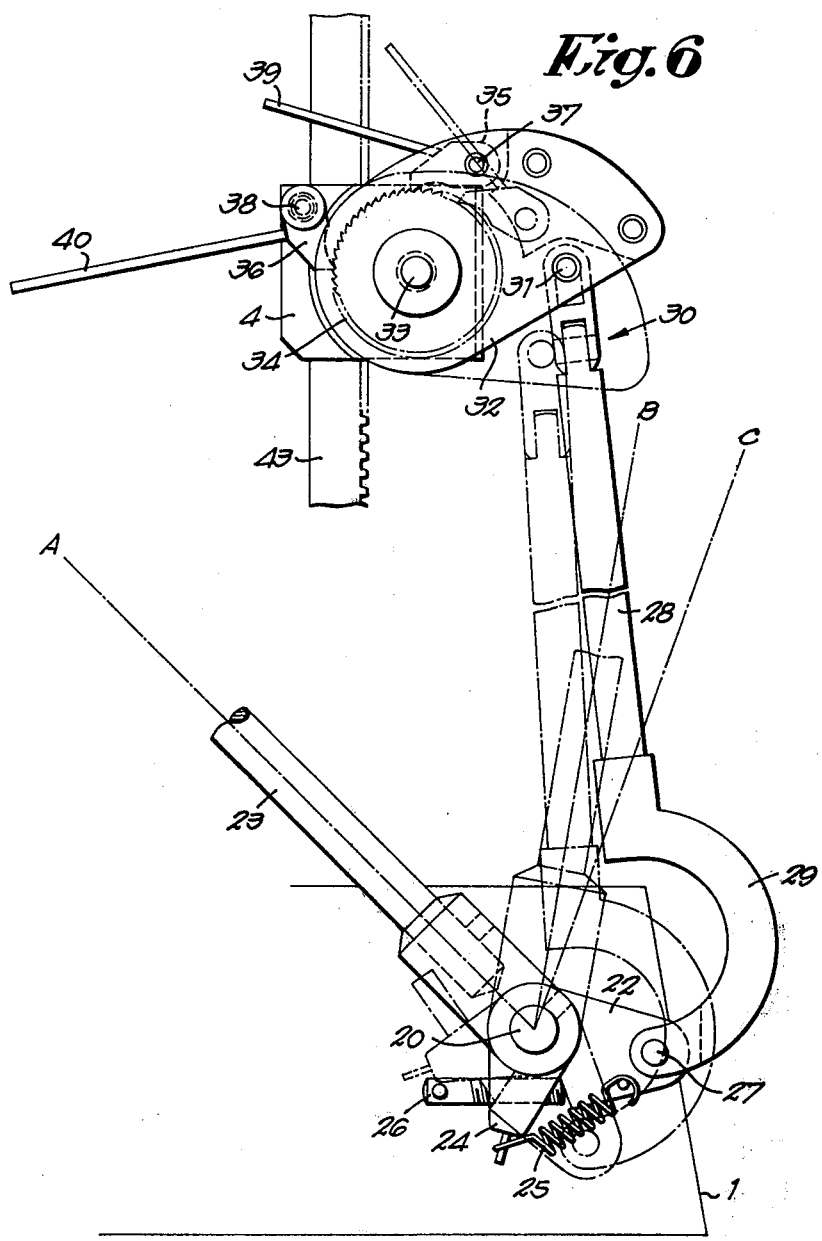

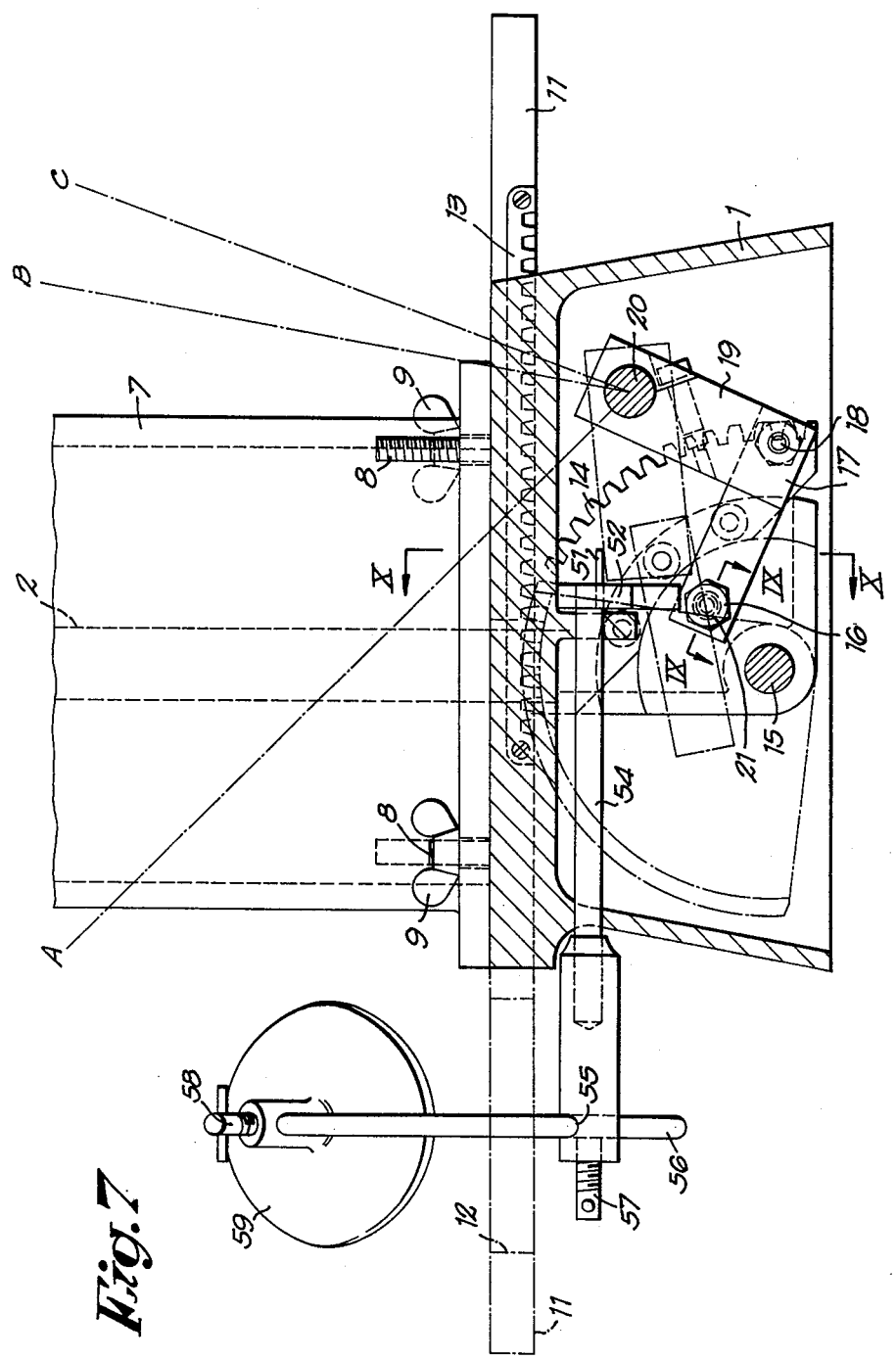

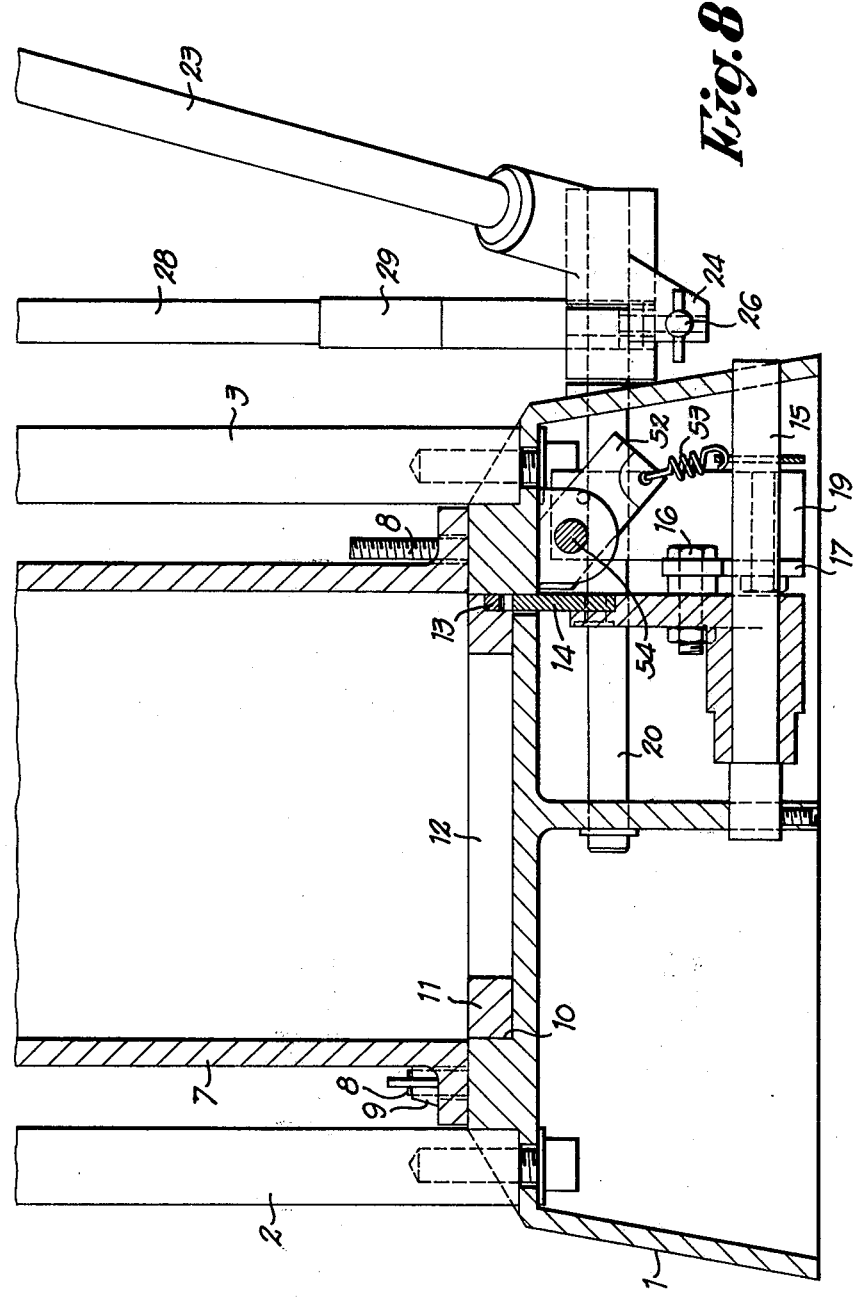

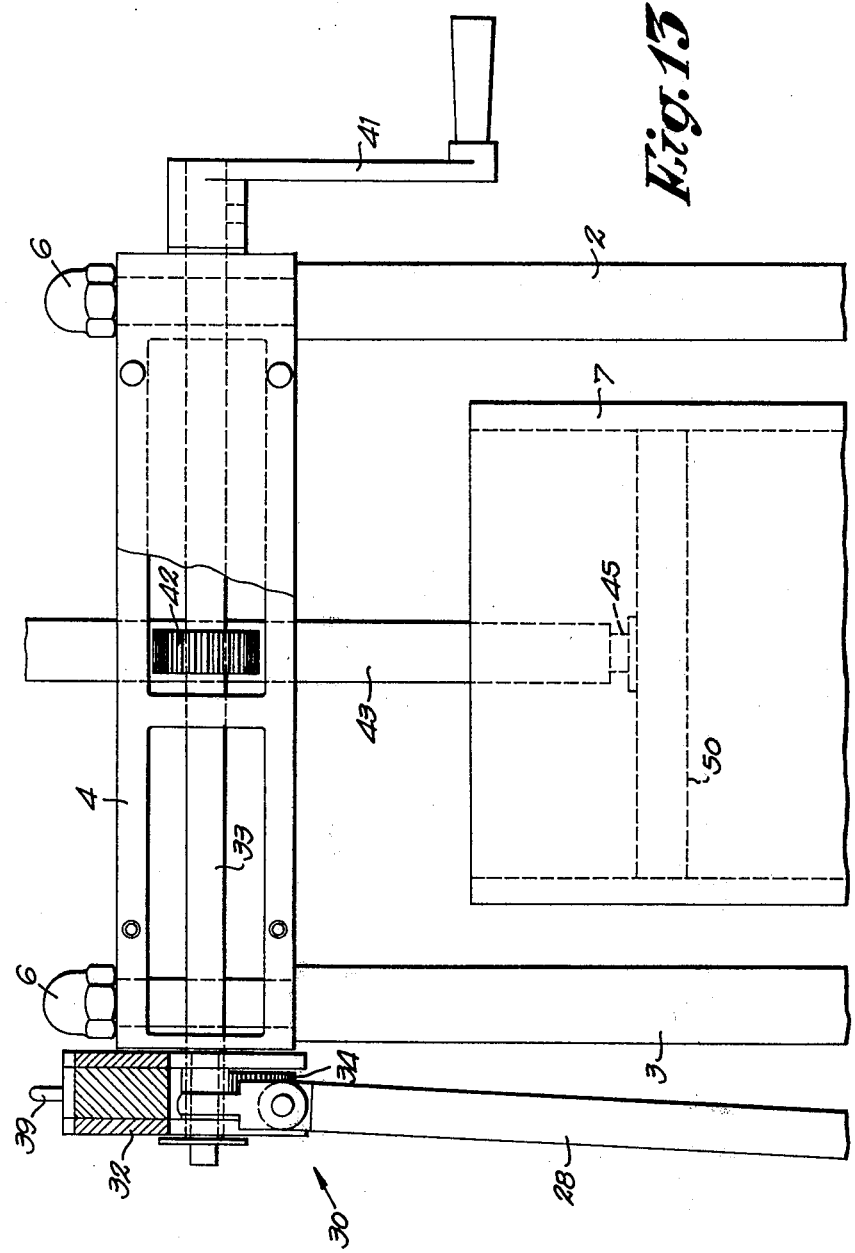

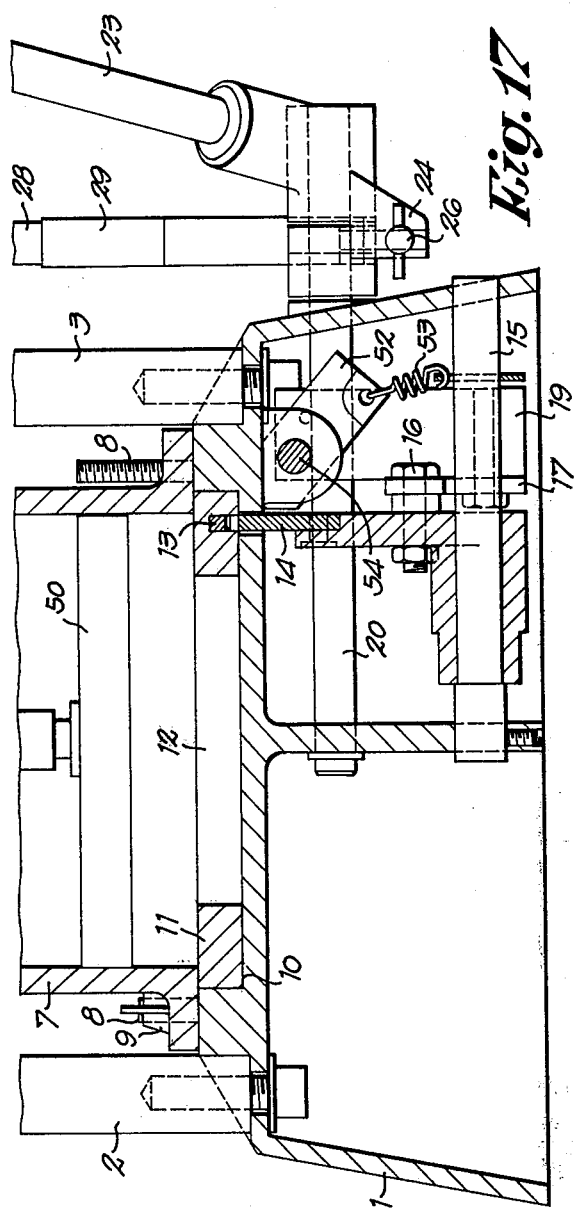

MACHINE FOR THE SHAPING OF MEAT DISHES

The present invention relates to a machine for the shaping of meat dishes such as hamburgers, meat balls and suchlike.

More particularly still, this invention relates to such a machine whereby the entire operation of forming and expulsing of the meat dish is obtained by one single alternating movement of a control lever, the operation of which requires but one hand, so that the other remains free for instance for moving the dish which is expulsed from the machine.

Although the machine remains of remarkably simple construction, and is consequently relatively cheap, it is possible therewith to form, at will, dishes of differing weight and/or of differing shape.

The machine which has the a forementioned as well as other advantages, mainly consists for this purpose of the combination of a mould plate provided therein with the required mould opening; means which successively locate this mould opening under a supply of meat and, after filling, remove it from under this meat supply; means for pressing the meat supply towards aforesaid plate in order to assure the proper filling of the mould opening, and means which eject the shaped dish out of the mould, whereby all these means function automatically and in the correct sequence by the operation with one single hand, of one single control lever.

In order to show more clearly the characteristics of the invention, a preferred form of embodiment will hereinafter be described, merely as an example and without the slightest intent of limitation, with reference to the appended drawings in which:

FIG. 1 shows a front view of a machine according to the invention;

FIGS. 2 and 3 are views respectively according to arrows F2 and F3 in FIG. 1;

FIGS. 4 and 5 show, to a large scale, those parts of FIG. 1 indicated respectively by F4 and F5;

FIG. 6 shows, to a larger scale, the driving device indicated in FIG. 2 by F6;

FIGS. 7 and 8 show, to a larger scale and with respect to the lower part of the machine, sections respectively according to lines VII—VII and VIII—VIII in FIG. 3;

FIG. 13 shows, to a larger scale, a section according to line XIII—XIII in FIG. 2;

FIG. 17 shows a section which is similar to that of FIG. 8, but for an alternative form of embodiment.

Figure 3:
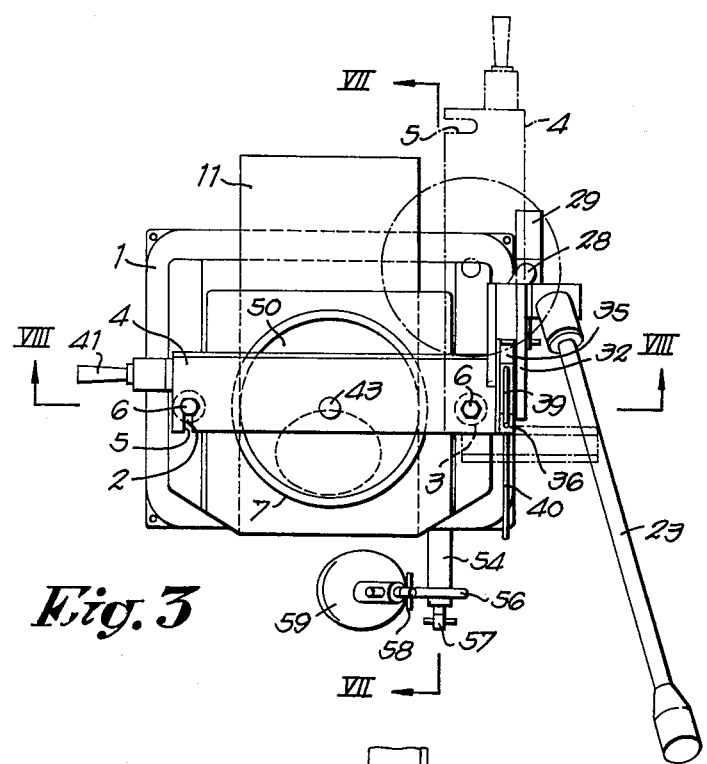
Figure 12:
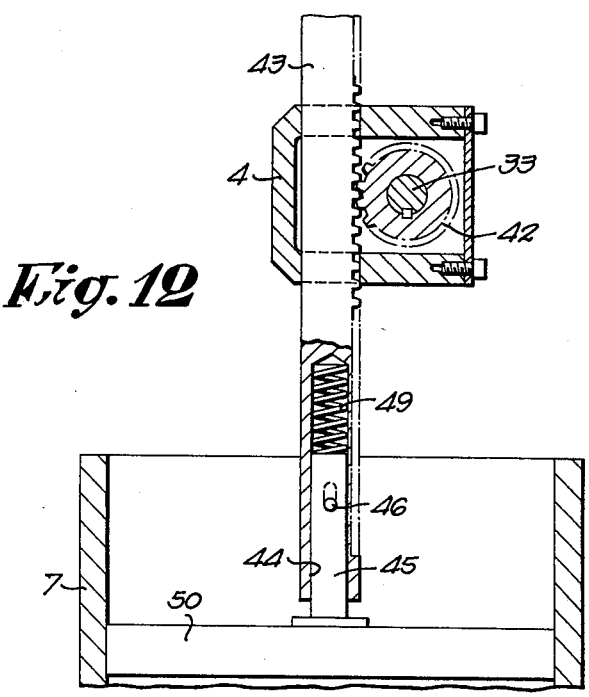
FIG. 12 shows a section according to line XII—XII in FIG. 5.
Figure 5:
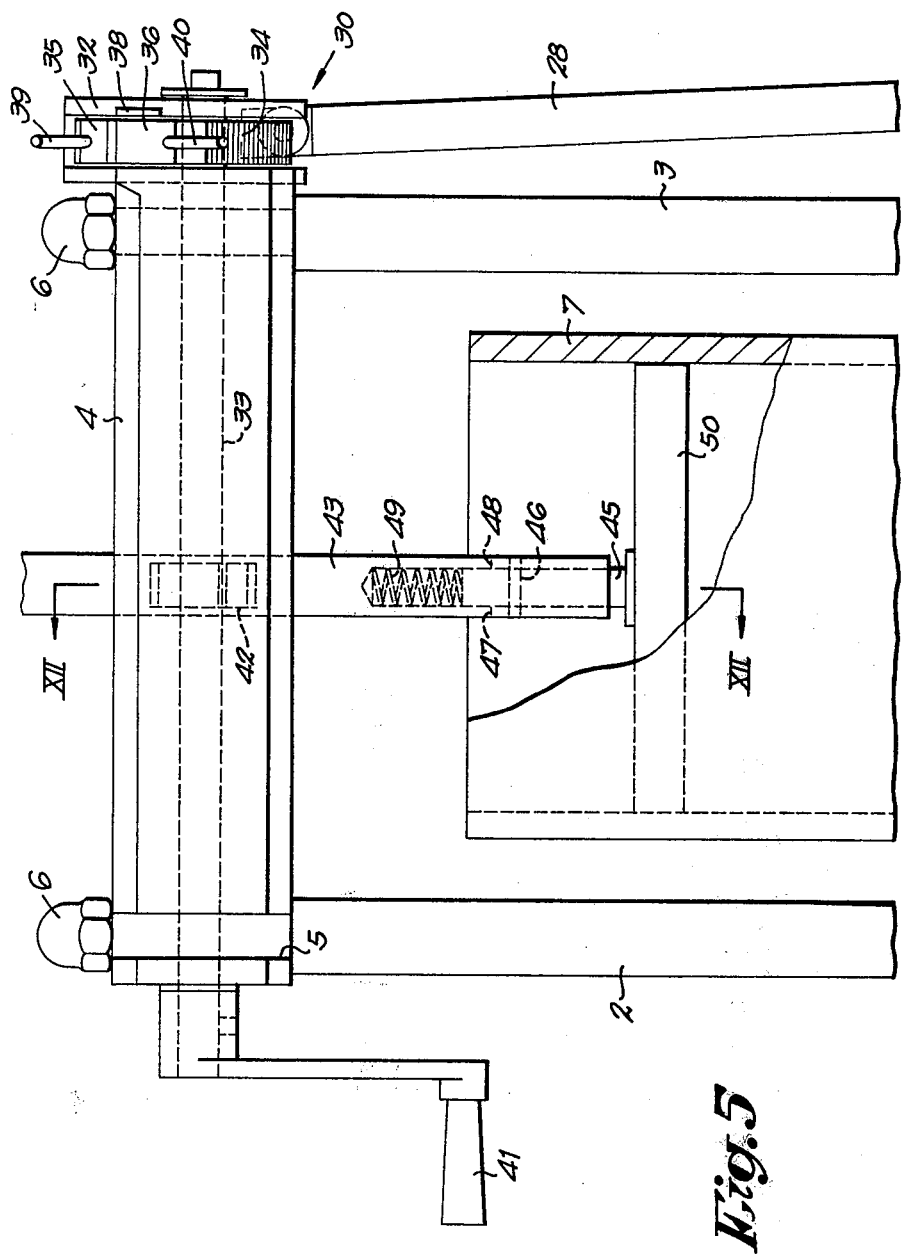
Figure 10:
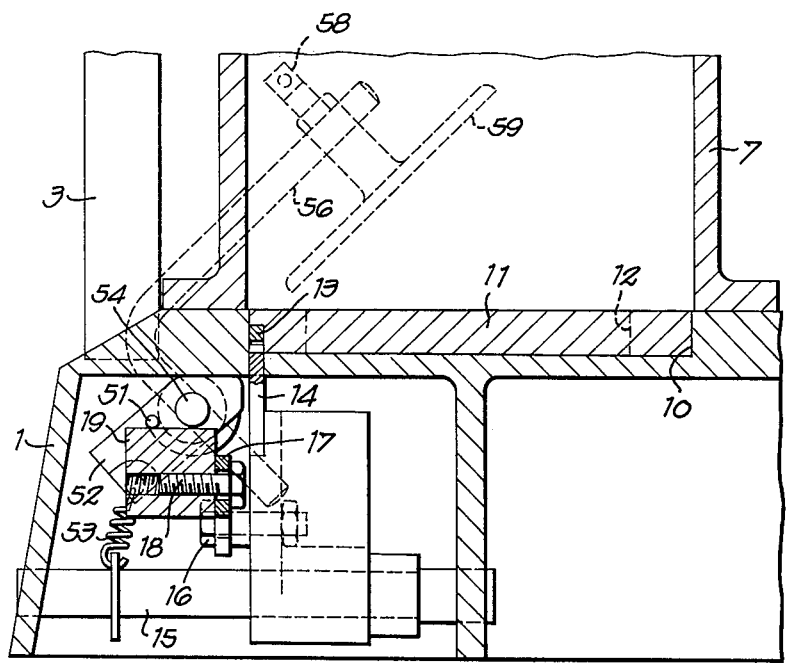
FIGS. 9 and 10 are sections respectively according to lines IX—IX and X—X in FIG. 7.
Figure 11:
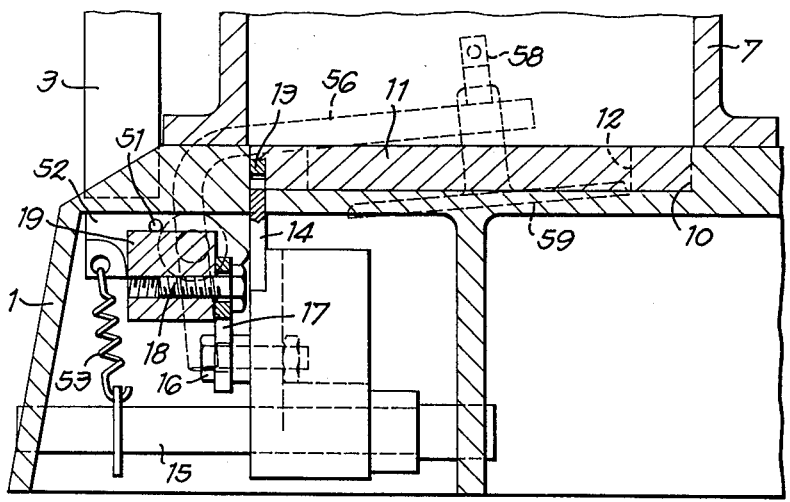
FIG. 11 is a similar view to that of FIG. 10, but in a second characteristic position.
Figure 9:
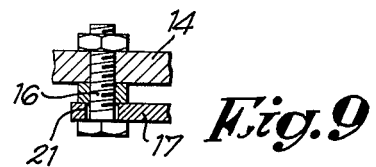

In the present form of embodiment the machine according to the invention mainly consists of a base 1 upon which two columns 2 and 3 are fixed, whereby an upper part or casing 4 is fitted, so as to be able to rotate but not to move axially, to one of these columns, in this case to column 3. This casing 4 is provided with a vertical U-shaped notch 5 which can cooperate with the second column 2. The latter is provided at its upper end with a nut 6 which, when necessary, permits casing 4 to be attached to column 2 by tightening thereof.

A supply container 7 is fitted on base 1 attached by means of threaded rods 8 which pass through holes in the bottom flange of the supply container and cooperate with wing nuts 9.

In aforesaid base 1, a space 10 is provided under aforesaid supply container 7, into which fits a mould plate 11 with appropriate opening 12. This plate 11 is provided at the bottom along one side with a rack 13 which engages a toothed sector 14, the latter being fitted rotatably but without possibility of axial movement upon a shaft 15 which is fixed in the base 1.

A lever 17 is hingedly attached to toothed sector 14 by means of a pivot pin 16, and is further hingedly attached at its other end by means of a pivot pin 18 to a second lever 19, the other end of which is fixedly attached to a shaft 20.

The hinging joint between lever 17 and sector 14 is such that at a certain moment the movement of lever 19 has no more influence upon lever 17. For this purpose, pivot pin 16 has for instance a diameter which is considerably smaller than the hole 21 in lever 17.

Shaft 20 extends outwards of base 1 and is provided there on the one hand with a small lever 22 which is free to rotate around this shaft, and on the other hand with a control lever 23 which is fixedly attached to this shaft 20.

Between small lever 22 and a protrusion 24 of lever 23 a spring 25 is provided which permanently stresses small lever 22 towards protrusion 24, whereby a screw 26 is provided in the matter and serves as adjustable stop for the small lever 22.

Small lever 22 is further connected by means of a pivot pin 27 to a lever 28, which has a curved part 29 at the lower end and is hingedly connected at its upper end, via a hinged link 30, by means of a pivot pin 31 to a further lever 32 which rotates freely around a shaft 33 which passes straight through aforesaid casing 4.

Upon this shaft 33, next to lever 32, a ratchet wheel 34 is fixed, with which two pawls, respectively 35 and 36, can cooperate. Pawl 35 is hingedly connected by means of a pivot pin 37 to a lever 32, whereas pawl 36 is hingedly connected by means of a pivot pin 38 to casing 4. Both pawls are further fitted with control rods, respectively 39 and 40.

At the other end of casing 4 and on the outside of this casing, aforementioned shaft 33 is provided with a crank 41 by means of which shaft 33 can be rotated, whereas a gear 42 is fixed to shaft 33 in the center of same.

This gear 42 cooperates with a rod 43 which is built as a rack and is guided in casing 4. This rod 43 is provided at its lower end with an axial bore 44 into which a pin 45 is fitted, whereby this pin is connected to rod 43 by means of a pivot pin 46. The latter is fixedly attached in pin 45 and cooperates by means of its extremities with elongated slots, respectively 47 and 48 in rod 43. Between the bottom of bore 44 and the nearby end of aforesaid pin 45 a spring 49 is provided which constantly tends to push pin 45 outward. The free end of pin 45 is finally fitted with a plate 50 which acts as a piston and which fits closely into supply container 7.

A pin 51 which is fitted on a lever 52 is finally placed along the path of lever 19, lever 52 being connected to the frame of the machine by means of a spring 53 of which one end is attached to this lever whereas the other end thereof is attached around some part which is fixed with respect to the base, such as for instance aforesaid shaft 15. A shaft 54 is connected to lever 52 and is fitted rotatably in some appropriate manner in base 1, whereby this shaft 54 is extended outside the base, where it is provided with a passage 55 for a rod 56, whereby this rod can be fixed with respect to shaft 54 in any appropriate location by means of a pressure screw 57. Rod 56 is provided appropriately curved, and can be fitted at its other end, also adjustably by means of a pressure screw 58, with a pressure plate 59 which serves the purpose of expelling the shaped meat dish out of the machine.

In the form of embodiment as illustrated in FIG. 17, the mould plate 11 and the space 10 have widened dimensions.

In this manner we obtain that the pressure which is exerted by piston 50 upon the meat which is in supply container 7 is transmitted directly to the mould plate, so that any meat juice and possibly meat which would tend to penetrate into the space under the base 1, must first be pressed horizontally between the supply container 7 and the mould plate 11, and then vertically down between the mould plate and the side wall of space 10, and subsequently between the mould plate and the horizontal bottom of space 10, so as finally to emerge below the base, next to toothed sector 14. It is quite clear that the juice and the meat, which must thus pass through the various sealing surfaces, have practically no occasion of reaching the space below the base, whereby, should it prove necessary, the number of changes in direction, which can avoid the penetration of the juice and the meat, can further be increased by a stepped shaping of the sides of plate 11 and respectively of the space 10. Thereby the path followed by the juice and the meat is increased. It would be possible to move rack 13 towards the center in order further to increase aforesaid path, whereby the sides of the plate may or may not remain straight.

The operation of the machine is very simple and as follows:

In position of rest, the machine appears as illustrated in FIGS. 1 to 3, whereby the ejection plate 59 is in its upper position; piston 50 is also in its upper position, whereby casing 4 is swivelled away, which is made possible by the presence of aforementioned hinging joint 30 of lever 28.

An appropriate mould plate 11 is fitted in the machine; the supply container is put into place and is filled with meat.

Next, casing 4 is swivelled back again to the position shown in the Figures the latter being eventually secured by the tightening of nut 6. At this moment the piston 50 will be applied by means of crank 41 to aforementioned mass of meat, somewhat compressing the latter.

The further operation of the device is entirely automatic and controlled merely by the alternating movement of the control lever 23 as described hereinafter.

During this movement, and before the beginning of actual work, a certain pressure will be exerted on aforesaid mass of meat due to the fact that, before the mass of meat is pressed into the appropriate moulds, a well determined pressure is exerted upon the mass of meat by piston 50, which is made possible by the presence of aforementioned spring 49. As a result, when the supply container 7 is practically full, the spring is entirely compressed and exerts a relatively large pressure on the mass of meat whereas, as the supply container empties, spring 49 is allowed to expend, so that the pressure on the meat becomes relatively less. Consequently there is always a pressure exerted on the mass of meat, which takes up the "elasticity" of the meat.

During the rearward movement of lever 23 from position A to position B we obtain first of all that, due to the rotation of shaft 20, lever 19 and therefore also lever 17 are driven, whereby the latter in its turn operates toothed sector 14, which has as consequence, that by the engagement of toothed sector 14 with the rack 13 of a mould 11 which is entered in the machine, this mould is moved forward, or in other words that this mould is moved in such a manner, that the mass of meat entered from the machine into opening 12 of the mould, is brought more particularly under ejector 59.

By this movement of the control lever 23, one obtains also that lever 22 is driven along by means of spring 25, whereby lever 28 and consequently also lever 32 are moved down by a well-defined value. During the downward movement of lever 32 in the clockwise sense, we obtain that pawl 36 prevents ratchet wheel 34 from rotating with lever 32, so that pawl 35 is moved by a well-defined number of teeth over ratchet wheel 34 by the movement of lever 32.

By further movement of the control lever 23 from position B to position C we obtain that lever 19 presses against pin 51 of lever 52, so that the latter is rotated around hinging point 54 and in opposition to spring 53, which also causes the rotation of this shaft 54 and consequently the downward movement of ejection plate 59 through opening 12 of mould plate 11.

When lever 23 is subsequently brought forward again, toothed sector 14 is again rotated towards the rear by means of levers 17 and 19, whereby the mould plate 11 is brought back to its rearmost position, i.e. with mould opening 12 under the supply container 7.

Simultaneously with the rearward movement of mould plate 11, we obtain by the forward movement of control lever 23 that lever 32 is rotated back towards the top, whereby in this case pawl 35 drives ratchet wheel 34, and consequently also rack 43 via shaft 33 and gear 42, so that piston 50 is moved down by a well-defined value, which results in the appropriate filling, with meat paste, of mould 12 provided in mould plate 11.

It will subsequently suffice to move lever 23 back towards the rear, in order each time to obtain as previously described, that with each rearward movement of lever 23 the mould plate 11 is first brought out of the machine after which ejector 59 presses out the shaped meat dish from opening 12, in the present case a hamburger, in order that, when lever 23 is again moved forward, the mould plate 11 is first moved back again with its opening 12 under the mass of meat, after which pressure is applied to the mass of meat, in order to obtain the appropriate filling of mould 12.

It is perfectly clear that in this manner by a single alternating movement of lever 23 an appropriate quantity of meat is pressed into the mould; this mould is moved outward; the shaped mass of meat is automatically ejected and the mould is brought back into the machine to be filled.

The present invention consequently relates to a machine which can be operated in the most simple manner, despite the complete automaticity which can be obtained therewith, and which is of extremely simple construction.

Figure 14:
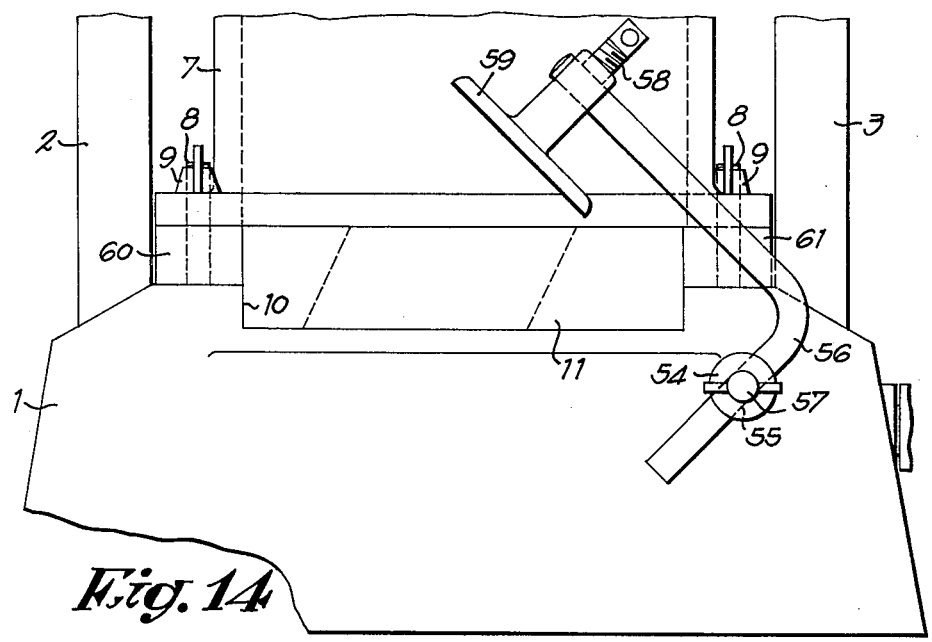
FIG. 14 is a schematic view, similar to that of FIG. 4, but for a different application, more particularly for the shaping of so-called meat balls.
Figure 15:
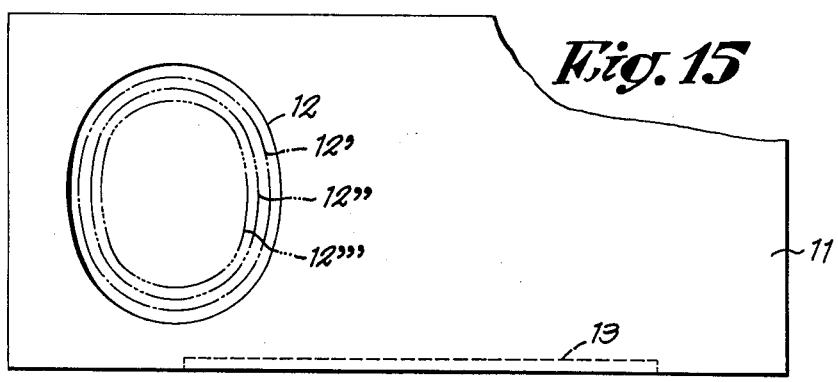
FIG. 15 shows a top view of a mould for the shaping of so-called hamburgers.
Figure 16:
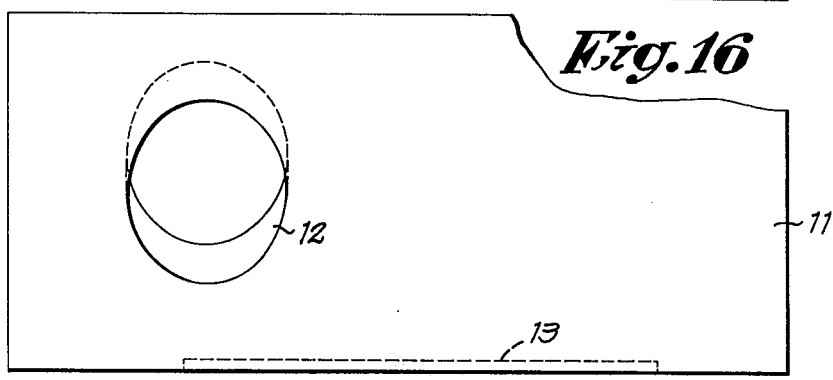
FIG. 16 shows a top view of a mould for the shaping of so-called meat balls.

It is obvious that the machine can be adapted for the fabrication of various meat dishes, in other words, hamburgers of different sizes, whereby other mould plates 11 are used for each different size and are always provided, as shown in FIG. 15, with other openings, respectively 12', 12'', 12'''. In another case the machine may be equipped with a mould plate as illustrated in FIG. 16 and whereby this plate, as shown in FIG. 14, is of a well-defined thickness in order, for instance, to form meat balls. In such a case the operation of the machine remains the same, although, in order to adapt the machine to a thick mould, for instance for meat balls, spacers will in this case have to be fitted, respectively 60 and 61, between the base and the supply container 7.

Furthermore, depending upon the mould plate used, or respectively depending upon the size of opening 12, respectively 12', 12'', 12''', a different ejector 59 shall be used, whereby this ejector will be appropriately moved on arm 56 and whereby this arm itself shall be appropriately moved with respect to shaft 54, one and other in such a manner that ejector 59 always passes freely through opening 12.

In order to adjust the quantity of meat which has to be brought in mould opening 12 per operation, it will be necessary to adjust the movement of aforesaid piston 50 per operation of control lever 23. For this purpose, screw 26 shall be respectively screwed in or screwed out, thereby moving lever 22 in such a manner that the stroke of the control lever from the position B to the position A each time causes a different height of movement of lever 32 so that, dependent upon this adjustment, the number of teeth of the ratchet wheel 34 which are moved by pawl 35 can be adjusted, which then results in a variable movement of piston 50.

It is obvious that the various parts of the machine as described above may, according to the invention, be replaced by equivalent means.

The present invention is thus by no means limited to the form of embodiment described as example and illustrated in the appended drawings, it being possible to build such a machine in all sorts of shapes and dimensions without going beyond the scope of the invention.

What I claim is:

1. Machine for shaping meat dishes, including a supply container for meat, a displaceable mold plate disposed below said container and having a mold opening therein, a control lever mounted on a first axle, first means for displacing said mold plate, second means for pushing a quantity of meat from said container into said mold opening and assure a proper filling thereof, and third means for pushing said quantity of meat out of said mold opening, said first, second and third means being coupled to said control lever, said first means comprising a first toothed rack connected to said mold plate and cooperating with a sector gear linked via a first lever arrangement with said axle, said second means comprising a vertical second toothed rack provided at one end with a disc forming a piston slidable in said container, the other end of said second rack cooperating with a gear wheel mounted on a horizontal axle, a ratchet wheel and a first lever fixed on one end of said horizontal axle, said ratchet wheel cooperating with a fixedly mounted first ratchet and with a second ratchet fixed on said first lever and said first lever being connected with the axle of said control lever by means of a second lever arrangement, and said first ratchet enabling the rotation of said ratchet wheel in one direction, whereas said second ratchet inhibits the rotation of said ratchet wheel in the other direction, said third means comprising a pin located in the path of said first lever arrangement, said pin being fixed on a second lever on which a second axle is fixed, said second axle carrying a pusher element for pushing said quantity of meat out of said mold opening.

2. Machine according to claim 1, wherein said first lever arrangement includes a third lever which is hingedly connected at one hand with the sector gear and which at the other hand is hingedly fixed on a fourth lever which is itself fixed on the axle of the control lever, said pin being situated in the path of said fourth lever and being controlled by said lever when the displacement of the sector gear is finished, said pin being operated during the motion of the third lever.

3. Machine according to claim 1, wherein said second lever arrangement includes a fifth lever and a link member which is hingedly connected to said first and fifth levers, said fifth lever being mounted on said axle of said control lever so as to be freely rotatable thereon, said fifth lever being urged towards said control lever by means of a spring, said control lever being to that end provided with a protrusion to which an end of said spring is connected.

4. Machine according to claim 1, wherein said piston is connected with the vertical second toothed rack via a pin mounted in said piston fitting in an axial bore provided in the corresponding end of said toothed rack, and wherein said pin is connected with said second toothed rack by means of a pivot extending transversely with respect to said pin, the ends of said pivot cooperating with vertical slots in said toothed rack, a pressure spring being provided between the end of said pin and the toothed rack.

5. Machine according to claim 1, which includes a base on which a frame is mounted by means of two vertical columns, said frame being mounted so as to be able to swivel with respect to one of said columns, said horizontal axle extending through said frame and said link member, comprising two parts which are hingedly connected to each other to enable said frame to be swivelled.

6. Machine according to claim 1, which includes a base to which said supply container is attached by means of threaded rods extending vertically upward out of said base and which are able to cooperate with holes in the bottom flange of said supply container, said threaded rods cooperating with wing nuts above said flange and wherein at least two threaded rods are of such length that the supply container can be attached to said base by means of spacers.

* * * * *